June 17, 1924.

W. B. JOHNSON

EXTRACTING TOOL

Filed Oct. 23, 1922

1,498,040

Inventor
W. B. Johnson
By Max A. Schmidt
Attorney

Patented June 17, 1924.

1,498,040

UNITED STATES PATENT OFFICE.

WILLIAM B. JOHNSON, OF LOUISVILLE, KENTUCKY.

EXTRACTING TOOL.

Application filed October 23, 1922. Serial No. 596,434.

*To all whom it may concern:*

Be it known that I, WILLIAM B. JOHNSON, a citizen of the United States, residing at Louisville, in the county of Jefferson and State of Kentucky, have invented certain new and useful Improvements in Extracting Tools, of which the following is a specification.

The tool which is the subject matter of the present application for patent has been designed more particularly for extracting stud bolts, stay bolts and similar screw-threaded fasteners which are headless, and the object of the invention is to provide a very simple and efficient tool by the use of which the removal of such fasteners is readily effected without mutilation of the threads thereof.

With the object stated in view, the invention consists in a novel combination and arrangement of parts to be hereinafter described and claimed; and in order that the same may be better understood, reference is had to the accompanying drawing, wherein—

Figure 1:
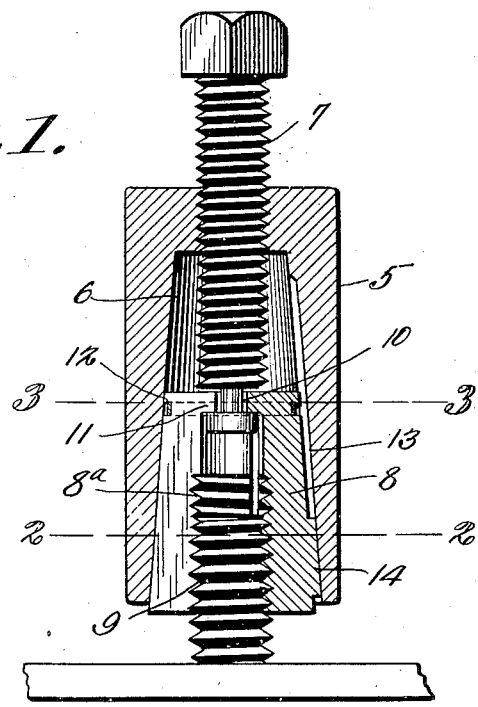
Figure 2:
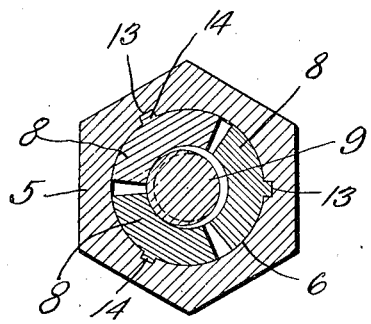
Figure 3:
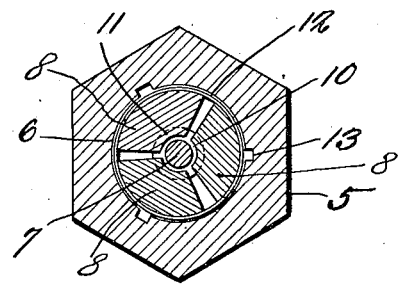

Figure 1 is a central longitudinal section of the tool showing the manner in which it is used, and Figs. 2 and 3 are cross-sections on the lines 2—2 and 3—3 of Fig. 1.

The preferred embodiment of the invention has been disclosed, but it will be understood that various changes and modifications may be made without a departure from the spirit and scope of the invention as claimed hereinafter.

In the drawing, 5 denotes the main body member of the tool, the same being elongated and of angular cross-section so that it may be readily grasped with a wrench. The body 5 has a longitudinal recess 6 opening through one end thereof, the other end being closed. Through the last-mentioned end of the body 5 is threaded a screw 7 which extends into the recess 6.

The recess 6 has an inward taper, and in the same is mounted a circular series of work-gripping jaws 8, three of such being provided. However, any other number of jaws may be used. The back of the jaws 8 are tapered to correspond to the taper of the recess 6, and hence when they are drawn into said recess they approach each other to grip the bolt or other work 9 which they encircle. The inner faces of the jaws are threaded, as shown at 8$^a$, to match the threads of the bolt 9.

The jaws 8 are operated by the screw 7, the inner end of the latter which is located in the recess 6 having an encircling groove 10, and the inner ends of the jaws having inturned lugs 11 seating loosely in said groove. At their upper ends, the jaws also have an external groove to seat a resilient ring or band 12 which encircles the series of jaws and holds the same at their inner ends loosely connected to the inner end of the screw 7.

The screw 7 is swiveled to the jaws 8 and when said screw is turned in the direction to draw the jaws farther into the recess 6, they approach each other to tightly grip the work 9. A wrench or other suitable tool may now be applied to the body 5 to rotate the same in a direction to unscrew the work 9, thereby effecting the removal thereof from the part into which it was screwed. In order to prevent rotation of the jaws 8 in the recess 6, the wall of the latter has longitudinal grooves 13 in which slidably seat ribs 14 on the back of the jaws.

The tool hereinbefore described is very simple in construction, highly efficient in operation, the removal of a headless bolt or similar threaded member being readily effected without danger of mutilating the threads thereof. The tool may be provided with several sets of jaws to fit bolts of various diameters.

I claim:

1. An extracting tool comprising a body having external wrench gripping faces and provided with an internal inwardly tapered recess opening through one end thereof, a correspondingly tapered expansible and contractible work-gripping device slidably but non-rotatably mounted in said recess, said device comprising a plurality of separable segments, and a screw threaded through the opposite end of said body and having its inner end swivelly and positively connected with the inner end of said device for sliding it in both directions.

2. An extracting tool comprising a body member having a recess opening through one end thereof and tapered inwardly, a screw threaded through the other end of the body member and extending into the recess, a circular series of work-gripping jaws slidably mounted in the recess and tapered externally to correspond to the taper of the recess, said jaws having inturned lugs at their inner ends, and the inner end of the screw having a circumferential groove in which said lugs loosely seat, and a resilient band encircling the jaws for retaining the lugs thereof in the groove of the screw.

In testimony whereof I affix my signature.

WILLIAM B. JOHNSON.